(12) United States Patent
Dierickx et al.

(10) Patent No.: US 7,289,148 B1
(45) Date of Patent: Oct. 30, 2007

(54) DEVICES AND METHODS FOR IMPROVING THE IMAGE QUALITY IN AN IMAGE SENSOR

(75) Inventors: Bart Dierickx, Mortsel (BE); Spyros Kavadias, Brussels (BE)

(73) Assignee: Cypress Semiconductor Corporation (Belgium) BVBA, Mechelen (BE)

( * ) Notice: Subject to any disclaimer, the term of this patent is extended or adjusted under 35 U.S.C. 154(b) by 0 days.

(21) Appl. No.: 09/308,032

(22) PCT Filed: Sep. 22, 1998

(86) PCT No.: PCT/BE98/00139

§ 371 (c)(1),
(2), (4) Date: Aug. 13, 1999

(87) PCT Pub. No.: WO99/16238

PCT Pub. Date: Apr. 1, 1999

(30) Foreign Application Priority Data

Sep. 22, 1997 (EP) ............................. 978701431
Oct. 24, 1997 (EP) ............................. 978701704

(51) Int. Cl.
*H04N 3/14* (2006.01)
*H04N 5/335* (2006.01)

(52) U.S. Cl. .................................... 348/294; 348/302

(58) Field of Classification Search ............... 348/243, 348/241, 230.1, 294, 300, 301
See application file for complete search history.

(56) References Cited

U.S. PATENT DOCUMENTS

| | | | | |
|---|---|---|---|---|
| 4,589,028 A | * | 5/1986 | Ochi ........................... | 348/247 |
| 4,843,473 A | * | 6/1989 | Bencuya et al. ............. | 348/306 |
| 4,914,519 A | * | 4/1990 | Hashimoto et al. ......... | 348/241 |
| 5,001,359 A | * | 3/1991 | Hashimoto et al. ......... | 327/126 |
| 5,311,320 A | * | 5/1994 | Hashimoto ................... | 348/243 |
| 5,321,528 A | | 6/1994 | Nakamura | |
| 5,335,008 A | * | 8/1994 | Hamasaki .................... | 348/301 |
| 5,339,106 A | * | 8/1994 | Ueno et al. .................. | 348/243 |
| 5,434,619 A | * | 7/1995 | Yonemoto .................... | 348/241 |

(Continued)

FOREIGN PATENT DOCUMENTS

EP          0 260 954 A2     3/1988

(Continued)

*Primary Examiner*—Vivek Srivastava
*Assistant Examiner*—Yogesh Aggarwal
(74) *Attorney, Agent, or Firm*—Blakely Sokoloff Taylor & Zafman LLP

(57) ABSTRACT

The present invention is related to an image sensor comprising an array of rows (i) and columns (j) of pixels ($X_{ij}$), all the pixels of one column of the array being connected to at least one common pixel output line ($l_j$) having at least one memory element ($M_j$) and at least a first amplifying element ($A_j$), all these amplifying elements ($A_j$) being connected to a common output amplifier (D). According to one preferred embodiment, said image sensor comprises: a second amplifying element ($B_j$) on the output of the memory element ($M_j$); said common output amplifier (D) having at least two input terminals; means (S1) for switching the pixel's signal on the common output line ($l_j$) and the memory element's signal ($M_j$) to respectively third and second amplifying element ($A_j$ and $B_j$) of one column; and means (S2) for switching the two output signals of the amplifying elements ($A_j$, $B_j$) of one column to respectively first and second input terminals of said common output amplifier (D).

9 Claims, 6 Drawing Sheets

U.S. PATENT DOCUMENTS 5,539,461 A * 7/1996 Andoh et al. ............... 348/308
5,585,652 A * 12/1996 Kamasz et al. ............. 257/231
5,790,191 A * 8/1998 Zhang ........................ 348/300
5,942,774 A * 8/1999 Isogai et al. ................ 257/292
5,949,483 A * 9/1999 Fossum et al. ............. 348/303
6,188,093 B1 * 2/2001 Isogai et al. ................ 257/230

FOREIGN PATENT DOCUMENTS

EP    0 481 373 A2    4/1992
EP    0 773 669 A2    5/1997

* cited by examiner

DEVICES AND METHODS FOR IMPROVING THE IMAGE QUALITY IN AN IMAGE SENSOR

FIELD OF THE INVENTION

The present invention relates to solid state imaging devices being manufactured in a CMOS- or MOS-technology.

More particularly, the principal object of the present invention is related to methods and devices which are able to improve the image quality in an image sensor.

Another object of the present invention is related to the improvement of the image quality by a method of correcting isolated pixel values present in an image taken by imaging devices.

BACKGROUND OF THE INVENTION

Solid state image sensors are well known. Virtually all solid-state imaging sensors have as key element a photosensitive element being a photoreceptor, a photo diode, a phototransistor, a CCD gate, or alike. Typically, the signal of such a photosensitive element is a current which is proportional to the amount of electromagnetic radiation (light) falling onto the photosensitive element.

A structure with a photosensitive element included in a circuit having accompanying electronics is called a pixel. Such pixel can be arranged in an array of pixels so as to build focal plane arrays of rows and columns.

Commonly such solid state image sensors are implemented in a CCD-technology or in a CMOS- or MOS-technology. Solid state image sensors find a widespread use in devices such as camera systems. In this application a matrix of pixels comprising light sensitive elements constitutes an image sensor, which is mounted in the camera system. The signal of said matrix is measured and multiplexed to a so-called video-signal.

Of the image sensors implemented in a CMOS- or MOS-technology, CMOS or MOS image sensors with passive pixels and CMOS or MOS image sensors with active pixels are distinguished. An active pixel is configured with means integrated in the pixel to amplify the charge that is collected on the light sensitive element. Passive pixels do not have said means and require a charge sensitive amplifier that is not integrated in the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Said functions can include filtering, operation at higher speed or operation in more extreme illuminations conditions.

Examples of such imaging sensors are disclosed in EP-A-0739039, in EP-A-0632930 and in U.S. Pat. No. 5,608,204. The imaging devices based on the pixel structures as disclosed in these patent applications however are still subject to deficiencies in the image quality of the devices.

A problem in these CMOS based imaging devices appears because material imperfections and technology variations have as effect that there is a non-uniformity in the response of the pixels in the array. This effect is caused by a non-uniformity or fixed pattern noise (FPN) or by a photo-response non-uniformity (PRNU). Correction of the non-uniformity needs some type of calibration, e.g. by multiplying or adding/subtracting the pixel's signals with a correction amount that is pixel-dependent.

Several methods to cancel FPN are based on techniques that are often called correlated double sampling or offset compensation. The methods in general are based on the following: the signal of the pixel is subtracted from the signal of the same pixels in a reference state (this reference state is typically the reset or dark state). The difference of both signal is free of pixel-related non-uniformity. However, if the differencing circuit is common for a part of the imager (typically, common for one column), a new non-uniformity will originate due to the non-uniformity of the differencing circuits. In a typical APS imager with common column buffers or column amplifiers, the new fixed pattern noise is column dependent, and is visible in the image as a shade of vertical stripes.

A stripe-shaped FPN is much more annoying than a pure statistical FPN. It is seen in experiments that a true random FPN of 5% RMS is barely visible to the human eye, whereas a stripe-shaped FPN remains visible even when the amplitude is below 1% RMS. The reason is that the human eye has a kind of built-in spatial filter that recognises larger structures even when they have low contrast.

Even if in the case that we have no fixed pattern noise, the photoresponse non-uniformity can be different from 0.

Another problem arises due to processing imperfections, statistics, etc. This means that typically, a finite number of pixels in a pixel array will be defective (hard faults) or yield a signal that deviates visibly from the "exact" pixel value. Such faults appear as white or black (or grey) points in the image. This class of faults in the sequel is called an isolated pixel value.

A known way to cancel these spots is to store a list of them and of their positions in the image in a memory unit in the device. In an image processing step, the isolated pixel value is then replaced by e.g. the average of the surrounding pixels. This method is viable, but has the disadvantage that it requires a memory. Moreover, it cannot handle isolated pixel values that appear intermittently or only in certain cases. A good example, is a so-called dark current pixel. Such pixels will appear white in a dark environment, but will behave normal in a bright environment.

Other ways to cancel isolated pixels faults have been proposed, e.g. the spatial median filter or other types of Kalman filters can be used to remove such isolated faults. Unfortunately, such filters do also remove useful detail from the image. Consider the image of a star covered sky with an image sensor that has some faulty pixels that appear white. The quoted filters are not able to remove the white point due to faults, and leave the white points that are stars untouched.

AIM OF THE INVENTION

The present invention aims to suggest a pixel structure and methods to improve the image quality, more in particular the image non-uniformity of in array of pixels by cancellation of the appearance of column-shaped fixed pattern noise (FPN).

MAIN CHARACTERISTICS OF THE PRESENT INVENTION

As a first object, the present invention is related to an image sensor comprising an array of rows and columns of pixels, all the pixels of one column of the array being connected to at least one common pixel output line having at least one memory element and at least a first amplifying element, all these amplifying elements being connected to a common output amplifier.

According to one preferred embodiment, the image sensor further comprises a second amplifying element on the output of the memory element, said common output amplifier having at least a first and a second input terminals, means for switching the pixel's signal on the common output line and the memory element's signal to respectively first and second amplifying elements of one column, and means for switching the two output signals of the amplifying elements of one column to respectively first and second input terminals of said common output amplifier.

Preferably, the switching means comprise at least one cross-bar switch.

According to another preferred embodiment, the image sensor further comprises before the amplifying element two parallel circuits being connected through switches to the common pixel output line, at least one circuit having said memory element. Preferably, both circuit have a memory element.

According to another preferred embodiment, said common pixel output line is being connected through switches to said memory element and said amplifying element, where the offset of the amplifying element is stored on the memory element during a first phase of the read-out, and this offset is subtracted from the signal of the amplifying element during the second phase of the read-out.

The present invention is also related to a method of reading out an array of rows and columns of pixels in an image sensor as described hereabove according to the first embodiment, comprising the steps of:

amplifying the output signals of essentially each pixel of one column in the first amplifying element thereby obtaining a set of amplified pixel output signals, amplifying the reference signals of essentially each pixel of one column in the second amplifying element, thereby obtaining a set of amplified pixel reference signals, consecutively, for essentially each pixel of said column imposing the amplified pixel output signal to a first or a second terminal of said common output amplifier and imposing the amplified pixel reference signal to a second or a first terminal of said common output amplifier, while switching the amplified pixel output signal to respectively said first and said second terminals for essentially each consecutive pixel of said column, said reference signal being imposed to the other terminal of said common output amplifier.

A voltage can be imposed to a node. In this case, it means e.g. that the node is connected to a voltage source. The voltage source should be higher than the node, i.e. it should have a lower impedance.

According to another preferred embodiment, the present invention is related to a method of reading out an array of rows and columns of pixels in an image sensor as described hereabove in the second embodiment of the present invention, comprising the steps of:

sampling the signal in a first phase and storing it in a memory element, sampling the signal in a second phase and possibly storing it in another memory element, subtracting said first signal from said second signal in a unique output circuit.

According to another preferred embodiment, the present invention is related to a method of reading out an array of rows and columns of pixels in an image sensor as described in the third embodiment of the present invention, comprising the steps of during a first phase, calibrating the output of the amplifying element to a predetermined value, storing said value in a memory element during the application of a first signal of said pixel on the line, during a second phase, applying a second signal of said pixel on the line in order to have on the output a signal proportional to the difference between first and second signals.

Another aspect of the present invention is related to a method of replacing an isolated pixel value in the image of an image sensor, being an array of pixels, and wherein at least one current source is connected to the pixels, the method comprising the step of:

limiting said isolated pixel value between or to an upper and/or a lower bound that is derived from the values of pixels in the immediate neighbourhood of the said isolated pixel value.

Preferably, said upper and/or lower bounds are found by extrapolating the immediate neighbourhood pixel values towards a value that corresponds to the position of said individual pixel in relation to the immediate neighbourhood pixels.

Said upper and/or lower bounds are found by extrapolating the values of a neighbour ($V_1N$) of the pixel having said isolated pixel value and of the neighbour thereafter ($V_2N$), the replacing pixel value being calculated as $V_1N+n*(V_1N-V_2N)$, n being a real number.

The neighbourhood and the neighbourhood thereafter are on the same row of said array. Preferably, the upper bound is the maximum of a set of values, said set being determined as the pixel values (a,b,c,d,e) of pixels on the same row of said array as said isolated pixel, said upper bound being calculated as $$cmax=F(a,b,c,d), \text{or } cmaxG(E(a,b),E(e,d),E(b),E(d))$$

where F is a non-linear or linear function, G is a non-linear GE or linear function, E is an extrapolating function, wherein cmax=MAX(2b-a,2d-e,b,d) together with $$cmin=MIN(2b-a,2d-e,b,d)$$

with MAX ( ) yielding the maximum, respectively the minimum of the arguments, the corrected c-value being obtained as $$c=MIN(MAX(c,cmin),cmax).$$

BRIEF DESCRIPTION OF THE DRAWINGS

FIG. 1b represents an embodiment of a cross-bar switch used in the structure represented in FIG. 1a.

FIG. 5 represent another particular implementation of a column FPN cancellation method and the corresponding image sensor structure therefor, wherein

BRIEF DESCRIPTION OF PREFERRED
EMBODIMENTS OF THE PRESENT
INVENTION

Figure 1A:
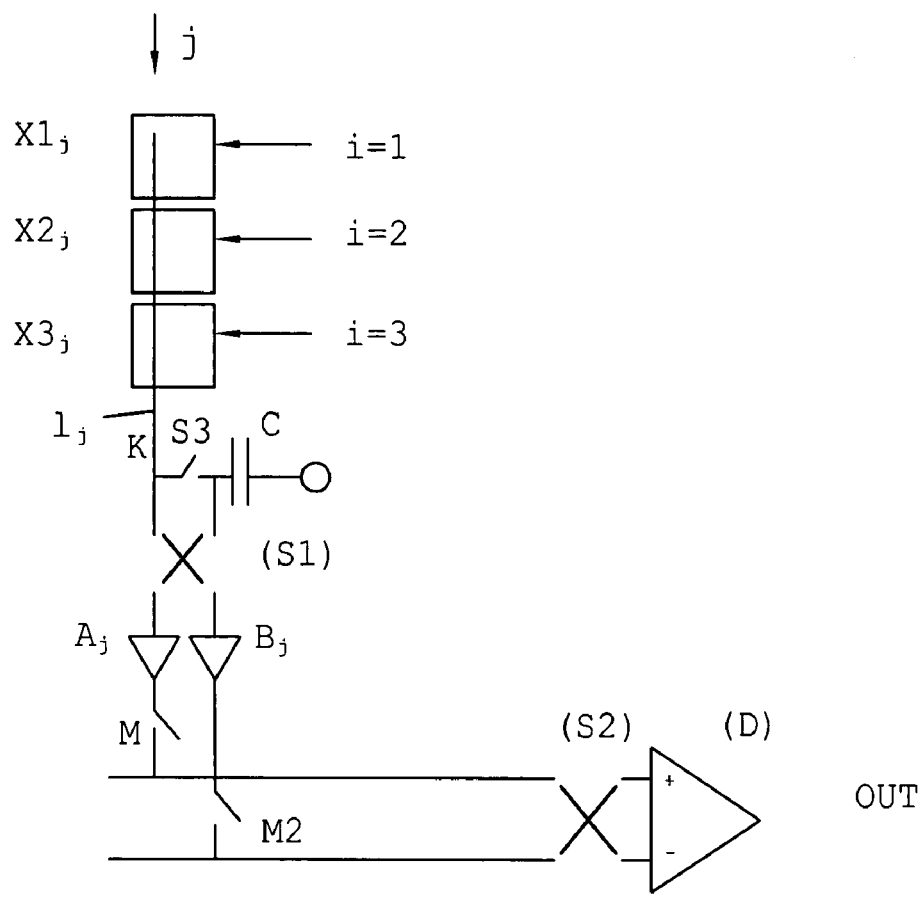
FIG. 1a represents a particular implementation of a column FPN cancellation method and the corresponding image sensor structure therefor.
Figure 1B:
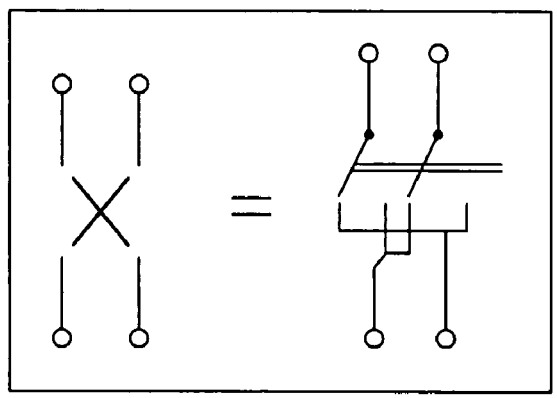

As a first object of the present invention, a first structure of an APS image sensor is represented in FIG. 1. References $(X_{1j})$, $(X_{2j})$ and $(X_{3j})$ are three pixels of a column of an image sensor. The pixel's signal on a common output line $(l_j)$ is represented in particular by the column bus "K" in the present case and is fed to the optional buffer amplifier $A_j$, and/or stored on a memory element (capacitor C+switch S3), and fed to amplifier $B_j$. By the relative timing of the addressed pixel's reset pulse and the control of the switch S3, one can make that the pixel's signal and its reference level are available on amplifiers $A_j$, reps. $B_j$. The fact that the signal passes through the column amplifiers $A_j$ and $B_j$, is a source of offset non-uniformity, which is column related and causes a vertical stripe-shaped FPN. More specifically, each column will feature an average "OV" offset voltage referred to the average of the other columns.

Switches (S1) and (S2) are crossbar switches. Suppose that they are in the forward direction either in crossed directions. Both switches S1 and S2 operate synchronously. In both cases, the signal on the capacitor C goes to the input of the output amplifier, and the signal on K goes to the + input of the output amplifier. Yet, the "OV" of the column will be positive in the one case and negative in the other case. Since the switches (S1)/(S2) are modulated, e.g. essentially turned direction at each new row (i=1, 2, 3) of the image, the average offset of a column will be zero. For each individual pixel of a column, there will be indeed remain an offset which is + or −OV but this is a very small feature, and is not recognised by the eye as a stripe.

Another embodiment of the present invention is to suggest a read-out scheme for image sensors that suppresses the effects of non-uniformities caused by variations in pixels as well as variations in the output amplifiers. This read-out scheme can be used in sensors that provide the output signal in terms of a difference. For example, in a sensor with integrating pixels, this difference is the voltage between the output when the pixel is on reset state and the output voltage after integration time.

Figure 2:
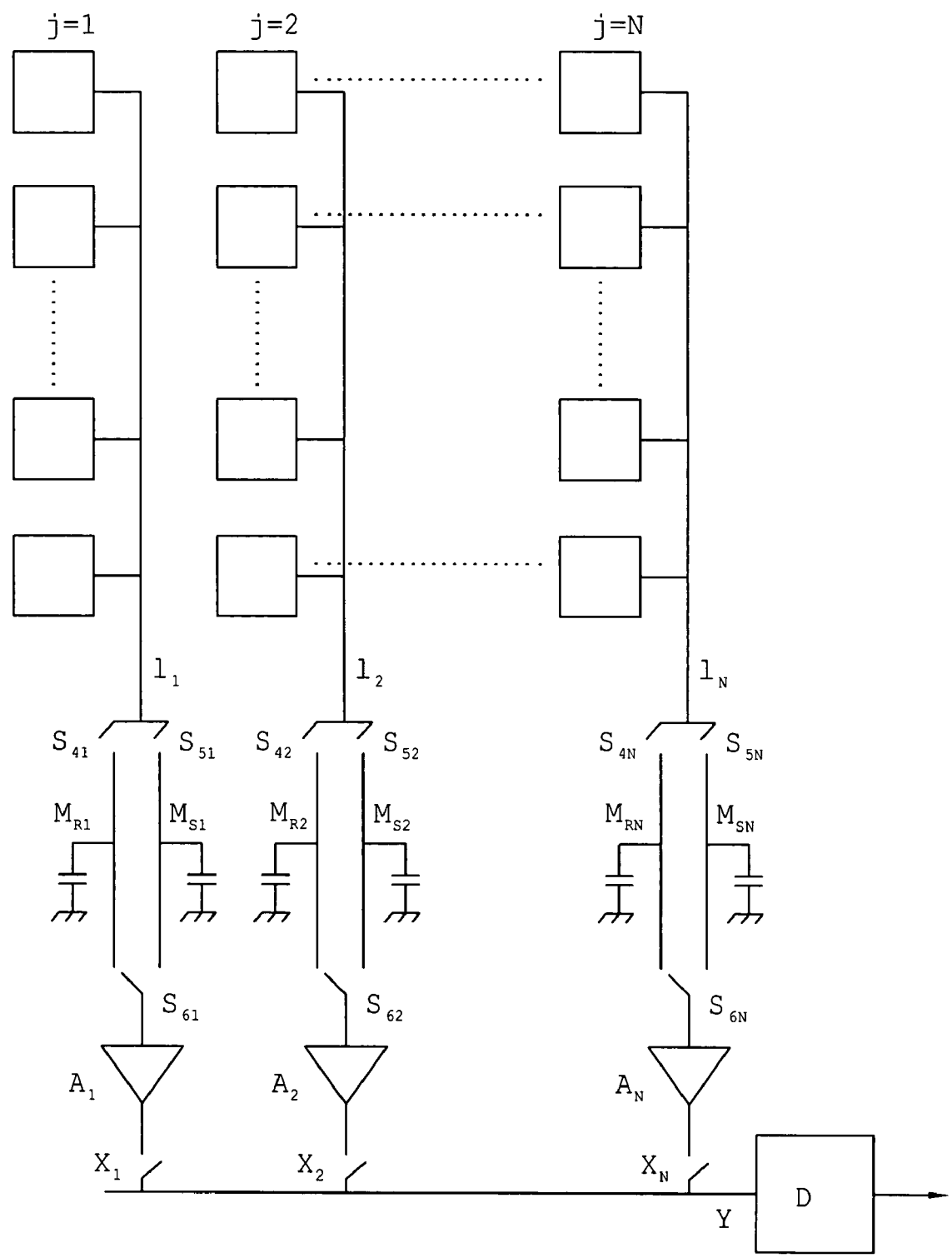
FIG. 2 describes another particular implementation of a column FPN cancellation method and the corresponding image sensor structure therefor.

Namely the method suggests to subtract the signal when a pixel is reset from the signal after the integration time, in order to have a signal which is free from pixel variations. In order to avoid the introduction of the non-uniform column amplifiers effects, the signal of the reset state as well as the signal after integration are sampled and held by the column read-out circuit. Finally, the subtraction is being carried out by a unique subcircuit at the sensor's output (D). This is detailed in FIG. 2.

For every row of pixels the read-out process is, of course, identical. Let us assume that the $i^{th}$ row is selected. When pixels are reset, the switches controlled by the signal $\Phi 1$, are closed, thus the reset-level output of every pixel on the $i^{th}$ row, namely $x_{ij}^r$, is stored on the corresponding memory element $M_{rj}$ (which is in the present case a capacitor).

Then, the switches $S4_j$ controlled by $\Phi 1$ are opened and pixels start integrating the charge carriers produced by the impinging light. After the lapse of the integration time, the switches $S5_j$ controlled by $\Phi 2$ are closed, thus storing the values of the pixel output to the memory element $M_{sj}$ (also a capacitor). This value, for the pixel with coordinates ij is denoted as $x_{ij}^s$.

After the sample and hold phase for the two voltages, $x_{ij}^r$ and $x_{ij}^s$, for the first column and by proceeding from the first column to the last, the appropriate column read-out circuit is connected with the output.

When the $i^{th}$ column has been selected, the signal $\Phi 3$ drives the switch $S6_j$ to led the signal $x_{ij}^r$ to the output modified according to the action of the column amplifier, so as a signal $$y_{ij}^s = A_j x_{ij}^s + B_j \quad (1)$$

is led to block D (common output amplifier).

The block D is an easily realisable circuit with an output $$z(n) = [y(n) - y(n-1)] \quad (2)$$

where y(n) denotes the input as instant n.

Figure 3:
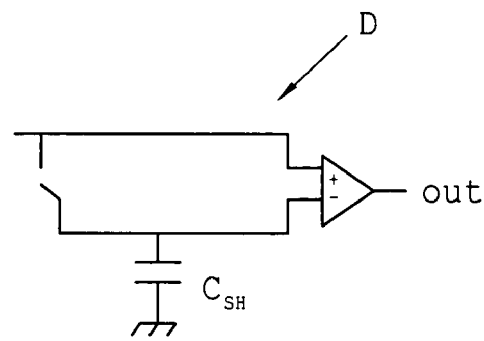
FIG. 3 describes a particular embodiment of an output block being used in the structure as represented in FIG. 2.

A preferred embodiment of such output block (D) is described in details in FIG. 3. Therefore, the output signal will be free from variations in the characteristics of pixels and the column amplifiers.

$$y_{ij}^r - y_{ij}^s = A_j(x_{ij}^r - x_{ij}^s) \quad (3)$$

where $A_j$ is easily reproducible, by example by using source followers as the local final phase of the column circuits (when $A_j=2$, $B_j=-V_{thj}$).

Figure 4:
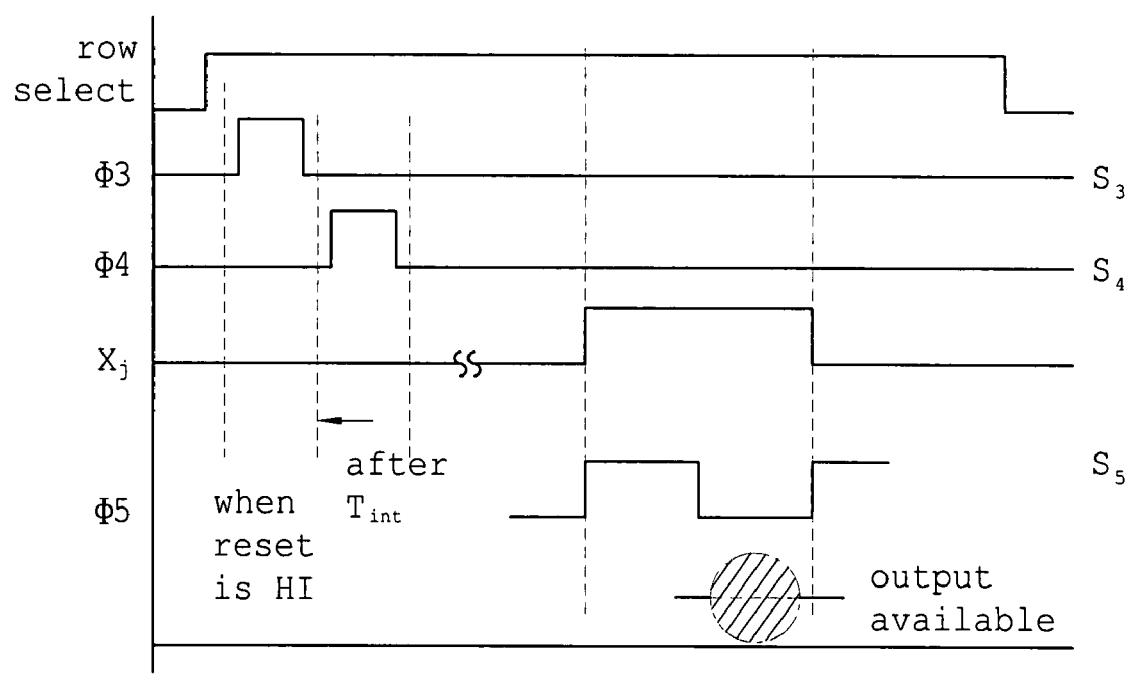
FIG. 4 represents the switching diagram for the read-out signal applied to the several switches in the structure as represented in FIG. 2.

FIG. 4 shows a switching diagram for the above-mentioned read-out circuit wherein $\Phi 3$ is controlling $S4_j$, $\Phi 4$ is controlling the switch $S5_j$ and $\Phi 5$ is controlling the switch $S6_j$.

Figure 5A:
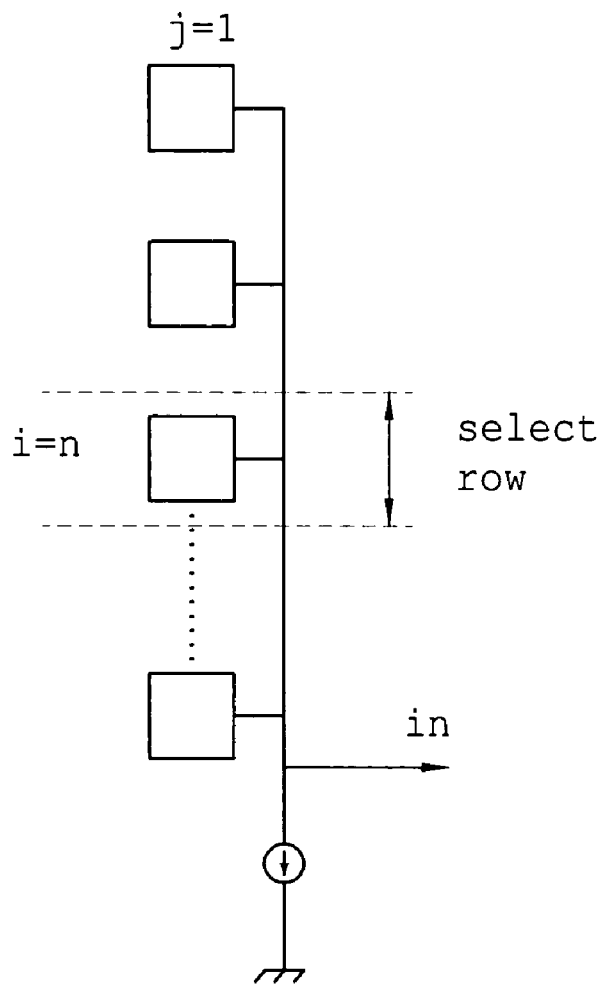
FIG. 5a represents more particularly one column in an array of pixels being connected to two different structures represented in details in FIGS. 5b and 5c during a first phase and a second phase.
Figure 5B:
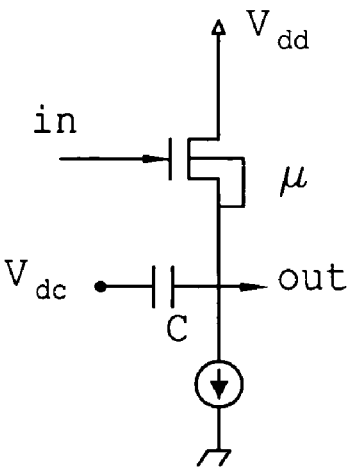
Figure 5C:
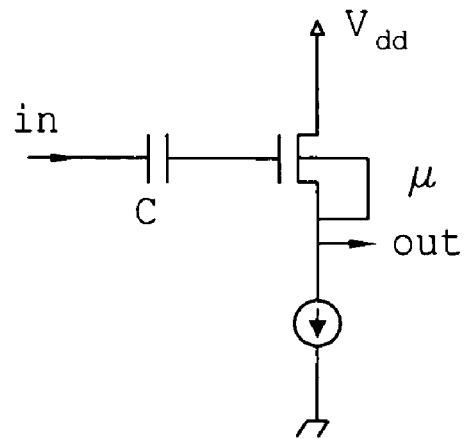
Figure 6:
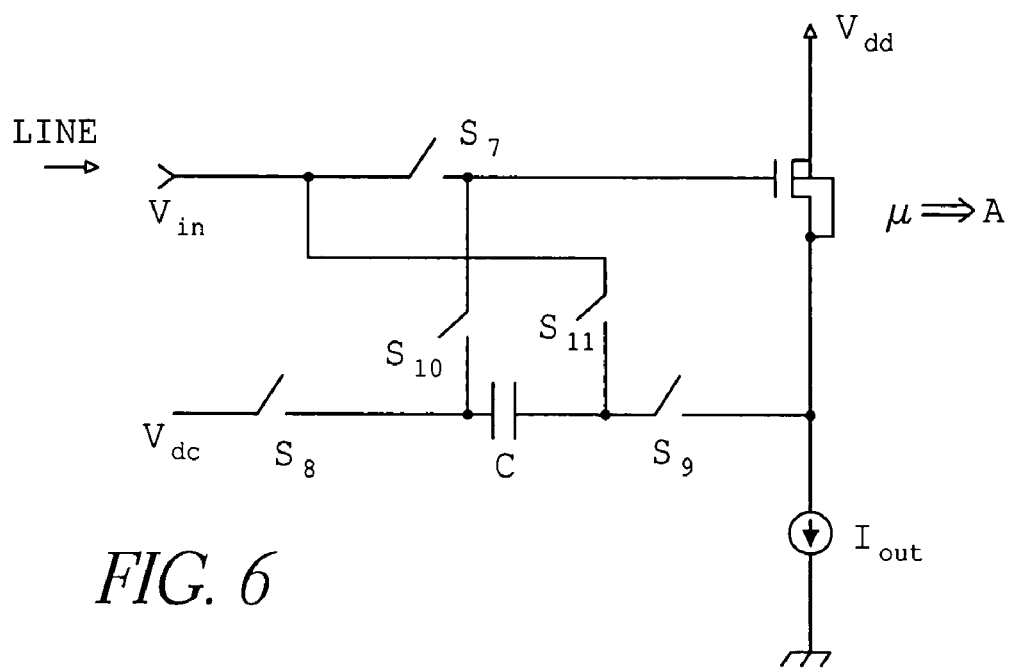
FIG. 6 represents the specific topology used for the structure represented in FIGS. 5b and 5c.

According to another embodiment of the present invention, an attempt to overcome the problem of offset introduced by the column in a image sensor consisting of pixels is described in FIGS. 5 & 6, which can be used with pixels that are read-out twice in every access. For example, in integrating pixels, one read operation is being performed when the pixel is set on the reset phase (first phase) and the second read-out moment is after a certain integration time (second phase), the first phase is defined by a period wherein the read-out signal of the pixel is according a first state while the second phase is defined by a period such as an integration period where the read-out signal of the pixel is in another state.

In the first phase, when pixel output is $V_1$, the capacitor C stores a charge:

$$Q=C(V_{ac}-V_{out})=C(V_{ac}-V_1+V_{th}) \quad (4)$$

where $V_{th}$ is the threshold voltage of µ.

During second phase, when pixel output is $V_2$, the capacitor stores again charge Q which now can be expressed as:

$$Q=C(V_{g\mu}-V_2) \quad (5)$$

where $V_{g\mu}$ is the gate voltage of µ.

From (4) and (5), we obtain:

$$V_{g\mu}=V_2-V_1+V_{ac}+V_{th} \quad (6)$$

Therefore:

$$V_{out}=V_2-V_1+V_{ac} \quad (7)$$

i.e. the output voltage does not depend on the $V_{th}$ (where variations in the $V_{th}$ cause offsets in the signal $V_{out}$).

The column amplifier can be implemented by using the topology described in details in FIG. 6.

Figure 7:
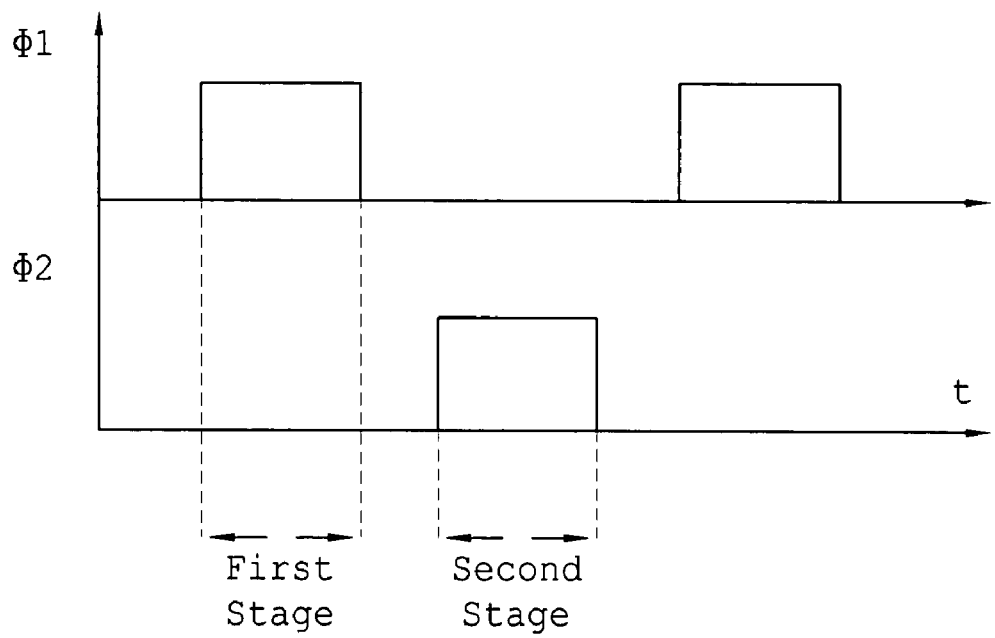
FIG. 7 represents the switching diagram for the read-out sequence to the several switches used in the structure represented in FIG. 6.

Switches S7, S8, S9, S10 and S11 are being controlled by signals Φ5 and Φ6 (when Φi is high, the corresponding switches are closed) as represented in FIG. 7.

According to a preferred embodiment represented in FIG. 7, S7, S8 and S9 are controlled by Φ5 while S10 and S11 are controlled by Φ6 (when Φi is high, the corresponding switches are closed). This means that Φ5 is describing the situation represented in FIG. 5b while Φ6 is representing the situation represented in FIG. 5c.

According to another aspect, the present invention is able to discriminate between isolated pixel faults and features in the real image. In the case of an image of a star covered sky, it should be noted that the fact that the image projected through a lens is never perfectly sharp. Even with good lenses, a star image is not projected on a single pixel. Always the point like source of the start will be smeared out over a central pixel and a few neighbours. In a 1-dimensional cross section, a star image will look like the image in FIG. 8a, while an isolated pixel fault will look like in FIG. 8b.

Figure 8A:
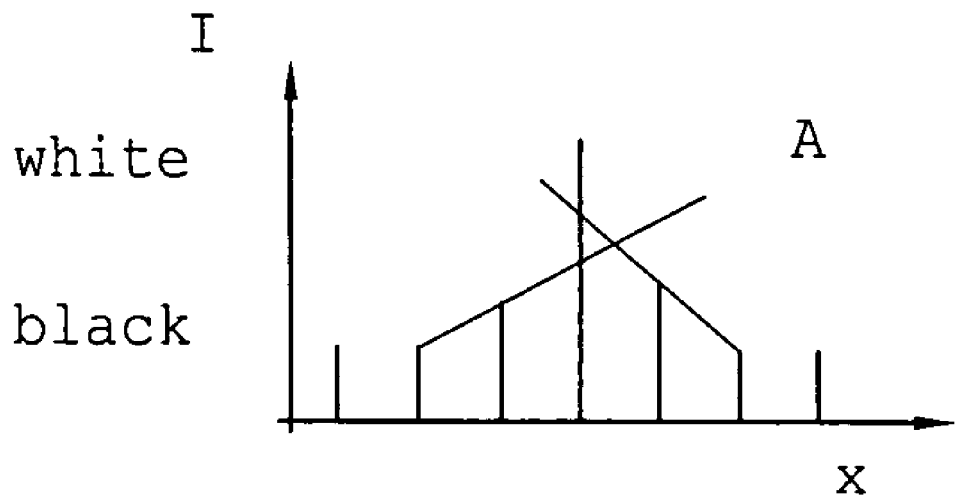
FIGS. 8a and 8b represent a method of correcting isolated white pixel values being present in an image composed by an array of pixels.
Figure 8B:
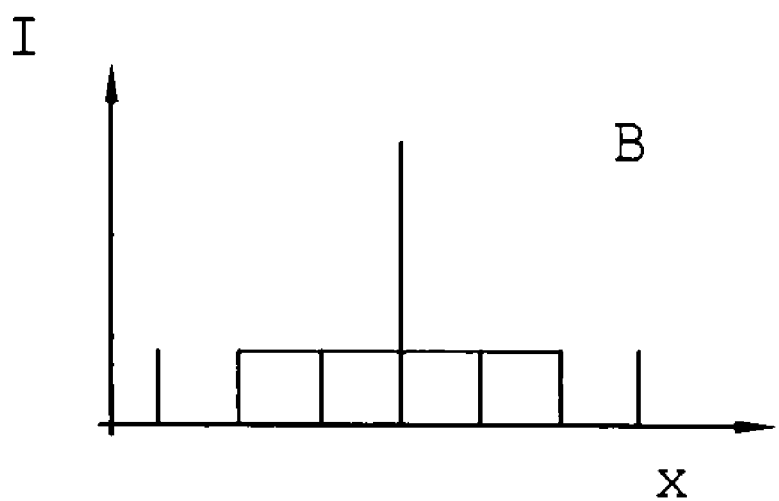

In the above simple example, the peak in FIG. 8b should be removed, while the peak in 8a should remain untouched.

The advantage is clear, only device faults are corrected while normal images are left untouched. The operation causes no visible image degradation in faultless parts of the image.

According to this second aspect of the present invention, a method to remove an isolated whiter or darker pixel from the image is suggested. This method consists in limiting the value of every individual pixel between an upper and/or a lower bound that is/are derived from the values of pixels in the intermediate neighbourhood of the said pixel.

Preferably, the upper and/or lower bounds are found by extrapolation of the neighbourhood pixel values towards the position of the said individual pixel. The upper and/or lower bound are/is a combination of one or several such 1-D or 2-D extrapolations done with different methods, and/or from different sides of the said individual pixel.

Preferably, extrapolation is the linear extrapolation of a neighbour (N1) of the said individual pixel (IP) and the neighbour thereafter (N2). The extrapolated value is calculated as 2*N1−N2 or more general: N1+n*(N1−N2) where the parameter n is a real number, typically between 0 and 3.

According to another preferred embodiment, the calculation of the upper bounds is performed by extrapolating values from the two sides of said individual pixels. The advantage is that only the pixels data in 1 line of an image are required, which saves memory and operations and allows straightforward implementation as a pipelined filter. Also such a filter is able to correct a vertical line defect.

In the example of FIGS. 8a and 8b, five pixels in a neighbourhood (a 5-pixel "kernel") are taken. The experience is that smaller kernels do not yield good results. Larger kernels may give some improvements compared to the 5-pixel kernel.

What is claimed is:

1. An image sensor, comprising:
   an array of pixels comprising a column of pixels;
   a pixel column output line coupled to the column of pixels;
   a first switch coupled to the pixel output line;
   a capacitor coupled to the first switch;
   a first crossbar switch having a first input coupled to the pixel column output line and a second input coupled to the capacitor, wherein the first crossbar switch has a first output and a second output;
   a first column amplifier having an input coupled to the first output of the first crossbar switch, wherein the first column amplifier has an output;
   a second column amplifier having an input coupled to the second output of first crossbar switch, wherein the second column amplifier has an output;
   a first bus line coupled to the output of the first column amplifier;
   a second bus line coupled to the output of the second column amplifier;
   a second crossbar switch coupled to the first and second bus lines; and
   an output amplifier coupled to the second crossbar switch.

2. The image sensor of claim 1, further comprising:
   a second switch coupled between the output of the first column amplifier and the first bus line; and
   a third switch coupled between the output of the second column amplifier and the second bus line.

3. The image sensor of claim 1, wherein the first and second crossbar switches are configured to operate synchronously.

4. The image sensor of claim 3, wherein the first and second crossbar switches are modulated.

5. The image sensor of claim 4, an array of pixels comprises rows of pixels, and wherein the first and second crossbar switches are switched at each of the rows of the pixels.

6. The image sensor of claim 1, wherein a first signal stored on the capacitor goes to the input of one of the first and second column amplifiers and wherein a second signal on the pixel column output line goes to the input of the other one of the first and second column amplifiers.

7. A method of operating an image sensor having an array of pixels, comprising:
   storing a first signal on a memory element of the image sensor,
   receiving a second signal on pixel column output line of an image sensor; and
   synchronously switching between outputting the first signal and the second signal, wherein the synchronous switching is performed using first and second crossbar switches, the first crossbar switch having a first input coupled to the pixel column output line and a second input coupled to the capacitor, wherein the first crossbar switch has a first output and a second output, wherein the first output of the first crossbar switch is coupled to a first column amplifier, wherein the second output of the first crossbar switch is coupled to a second column amplifier, the first and second output amplifiers being coupled to first and second bus lines, respectively, and wherein the second crossbar switch is coupled to the first and second bus lines.

8. The method of claim 7, further comprising modulating the synchronous switching at each row of the array of pixels.

9. The method of claim 7, wherein the memory element comprises a first switch coupled to a capacitor, the switch being coupled to the pixel column output line.

* * * * *